United States Patent
Nesheiwat

(10) Patent No.: US 12,478,159 B2
(45) Date of Patent: Nov. 25, 2025

(54) TREATMENT FOR HAIR LOSS AND BALDNESS

(71) Applicant: Najla Nouri Nesheiwat, Poughkeepsie, NY (US)

(72) Inventor: Najla Nouri Nesheiwat, Poughkeepsie, NY (US)

(*) Notice: Subject to any disclaimer, the term of this patent is extended or adjusted under 35 U.S.C. 154(b) by 317 days.

(21) Appl. No.: 17/196,432

(22) Filed: Mar. 9, 2021

(65) Prior Publication Data

US 2023/0371669 A1  Nov. 23, 2023

(51) Int. Cl.

| | |
|---|---|
| *A61K 36/67* | (2006.01) |
| *A45D 19/00* | (2006.01) |
| *A61K 8/92* | (2006.01) |
| *A61K 36/185* | (2006.01) |
| *A61K 36/22* | (2006.01) |
| *A61K 36/31* | (2006.01) |
| *A61K 36/47* | (2006.01) |
| *A61K 36/55* | (2006.01) |
| *A61K 36/63* | (2006.01) |
| *A61K 36/71* | (2006.01) |
| *A61K 36/73* | (2006.01) |
| *A61K 36/736* | (2006.01) |
| *A61K 36/889* | (2006.01) |
| *A61K 36/8962* | (2006.01) |
| *A61N 5/06* | (2006.01) |
| *B08B 1/12* | (2024.01) |
| *A61B 17/32* | (2006.01) |

(52) U.S. Cl.
CPC ............ *A45D 19/005* (2021.01); *A61K 8/922* (2013.01); *A61K 36/185* (2013.01); *A61K 36/22* (2013.01); *A61K 36/31* (2013.01); *A61K 36/47* (2013.01); *A61K 36/55* (2013.01); *A61K 36/63* (2013.01); *A61K 36/67* (2013.01); *A61K 36/71* (2013.01); *A61K 36/73* (2013.01); *A61K 36/736* (2013.01); *A61K 36/889* (2013.01); *A61K 36/8962* (2013.01); *A61N 5/0617* (2013.01); *B08B 1/12* (2024.01); *A61B 2017/320004* (2013.01); *A61K 2236/15* (2013.01); *A61N 2005/0657* (2013.01)

(58) Field of Classification Search
None
See application file for complete search history.

(56) References Cited

U.S. PATENT DOCUMENTS

| | | | |
|---|---|---|---|
| 2016/0346191 A1 | 12/2016 | Petkoska | |
| 2018/0360739 A1 | 12/2018 | Lorenz | |

FOREIGN PATENT DOCUMENTS

| | | | | |
|---|---|---|---|---|
| EP | 1112745 A1 * | 7/2001 | ............ | A61K 36/67 |
| JP | 2011026280 | 2/2011 | | |
| WO | WO-2006092151 A1 * | 9/2006 | ............ | A61K 31/05 |

* cited by examiner

*Primary Examiner* — Susan Hoffman

(74) *Attorney, Agent, or Firm* — Shumaker, Loop & Kendrick, LLP; Lloyd J. Wilson

(57) ABSTRACT

A formula and method to counteract hair loss, where the formula is a mixture. The mixture consists of Flaxseed oil, Coconut oil, Castor oil, Nigella sativa oil, Olive oil, Sesame oil, Sweet Almond oil, Bitter Almond oil, Watercress oil, Jojoba oil, Garlic oil, Onion oil, and Pistacia lentiscus oil. The oils derived from seeds are cold rolled to produce the oil. The mixture is applied to the scalp after brushing and washing of the scalp area to be treated.

2 Claims, No Drawings

TREATMENT FOR HAIR LOSS AND BALDNESS

BACKGROUND

The present invention generally relates to hair loss and baldness. More specifically, the present invention relates to a formula and method of application for hair loss and baldness.

There are many products and methods to counteract hair loss and baldness. These solutions not as effective as one would hope and many require use of non-natural chemicals, ingestion of pills and so forth. Examples are Rogaine or Minoxidil. Hair growth, hair density and retention of current products is poor.

It is an object of the present invention to provide a formula and method application to counteract hair loss and baldness.

SUMMARY

A formula and method to counteract hair loss, where the formula is a mixture. The mixture consists of Flaxseed oil, Coconut oil, Castor oil, Nigella sativa oil, Olive oil, Sesame oil, Sweet Almond oil, Bitter Almond oil, Watercress oil, Jojoba oil, Garlic oil, Onion oil, and Pistacia lentiscus oil. The oils derived from seeds are cold rolled to produce the oil. The mixture is applied to the scalp after brushing and washing of the scalp area to be treated.

DETAILED DESCRIPTION

The present invention is a formula and method of application for counteracting hair loss and baldness. It is a treatment that helps people recover from hair loss. It is a homeopathic treatment using very pure, organic and natural oils. The formula uses a series of natural oils, in combination with application of brushes and rollers to the skin that over several weeks allows the hair to regrow. The brushes are used to clean dead skin away and open up the pores to allow the oils to have effect. The formula consists of mixture of oils that are cold pressed from seeds and other oils. The oil from the seeds is cold pressed to retain the nutritional contents and smell from the seeds. The formula consists of Flaxseed oil, Coconut oil, Castor oil, Nigella sativa oil, Olive oil, Sesame oil, Sweet Almond oil, Bitter Almond oil, Watercress oil, Jojoba oil, Garlic oil, Onion oil, and Pistacia lentiscus oil (wild pistachio oil). The formula mixture is a mixture of an equal ratio of each of the oils in the formula, except the Castor oil, which is double the amount of any one of the other oils. A batch for treatment of the scalp is usually 5 ml of each oil in the mixture, except for the Castor oil, which is 10 ml.

The process of application begins with brushing the scalp to clear the scalp of dead-skin and surface buildup of detritus. There are three brushes used that go progressively from soft to firm. Soft to firm is as defined by professional sources such as barber suppliers, brush companies such as The Fuller Brush company and preservationists. A derma roller is used on the scalp to help open the pores. The derma roller is widely commercially available and defined as a skincare device used to treat fine lines, acne scars, large pores, and uneven skin tone. The derma roller features a handle and a roller with tiny needles on the roller surface to puncture the skin and stimulate collagen production. The hair is then washed in warm water, finishing with hot water to open the hair follicles. The oils of the formula are mixed and then massaged into the scalp. Next, the fruit of a fresh organic avocado is blended together with 5 ml each of coconut oil and bitter almond oil to create a mask that is applied to the scalp. The scalp is then steamed for 20-30 minutes. The scalp is steamed using a commercial hair salon steamer that covers the head or a cap connected to a steaming device. There is a less effective way to replace the steaming process with the heat from direct sunlight. Then, the scalp is massaged again for 5 minutes. Next, the hair is washed with warm water and at the end cold water. This application process is repeated every two weeks for an average of ten treatments. People treated are advised to minimize the wearing of hats during the treatment, to reduce the buildup of sweat and detritus. They are also advised to use natural hair shampoos to avoid chemical impact. Hot water is defined to be at a range of 105 to 115 degrees Fahrenheit. Warm water is defined to be at a range of 90 to 105 degrees Fahrenheit. Cold water is defined to be at a range of 45 to 55 degrees Fahrenheit.

Another embodiment is a Psoriasis treatment for the treatment of Psoriasis, which uses a method adapted from the previously mentioned formula. The method for treating Psoriasis includes pure olive oil and finely ground black pepper. A batch for treatment would be a mixture of 250 ml of olive oil and 125 ml of ground black pepper to form a Psoriasis treatment mixture. The Psoriasis mixture is applied three times daily to a specific area of skin impacted and then exposed to sunlight for one hour. The method of the Psoriasis treatment is performed three times daily for one month, if possible and it is recommended not to cover impact area with a hat or similar fabric like a scarf, in order to properly air the treated area. The Psoriasis treatment mixture should not come in contact with the eyes due to the pepper content.

Another embodiment is an Alopecia treatment, again adapting the previously mentioned formula. The method for treating Alopecia includes fresh crushed garlic cloves from two heads of garlic, garlic oil, onion oil and apple cider vinegar. The scalp is brushed to clear the skin of dead-skin and surface buildup of detritus. The affected area is rubbed with a natural loofah to scratch the area, until the skin becomes reddened. The area is first dabbed with apple cider vinegar using a cotton cloth. The garlic cloves are crushed and mixed whole with 10 ml of onion oil and 10 ml of garlic oil and 5 ml of apple cider vinegar to form an Alopecia treatment mixture. During mixing, the mixture is ground together until smooth, then applied to the treatment area and covered for eight hours with cotton, wool or similar fabric, generally in the form of a cap or other wrapping to hold in the oil mix. The method of the Alopecia treatment is done daily for 5-10 days.

While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

I claim:

1. A method of treatment for Psoriasis using a mixture consisting of olive oil and black pepper in a ratio of 250 ml of the olive oil to 125 ml of the black pepper, the method comprising applying the mixture three times daily to a specific area of skin impacted and then exposing the skin to sunlight for at least one hour.

2. The method of claim 1, wherein treatment is performed three times daily for at least one month.

\* \* \* \* \*